US008676147B1

(12) United States Patent
Curry et al.

(10) Patent No.: US 8,676,147 B1
(45) Date of Patent: Mar. 18, 2014

(54) DETECTION SYSTEM, CONTROLLER, AND METHOD OF DETECTING A SIGNAL OF INTEREST

(71) Applicant: The Aerospace Corporation, El Segundo, CA (US)

(72) Inventors: Samuel J. Curry, El Segundo, CA (US); Masahiro Sayano, El Segundo, CA (US); David M. Schwartz, El Segundo, CA (US); Kristine Y. Tsai, El Segundo, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 13/690,571

(22) Filed: Nov. 30, 2012

(51) Int. Cl.
*H04B 1/16* (2006.01)
(52) U.S. Cl.
USPC ............ 455/334; 455/323; 375/343; 370/286
(58) Field of Classification Search
USPC .......... 455/313, 323, 334, 336–338; 375/340, 375/343; 370/286, 289
See application file for complete search history.

(56) References Cited

U.S. PATENT DOCUMENTS

| 5,974,042 | A  | * | 10/1999 | Frank et al. ............. 370/342 |
| 7,801,242 | B2 | * | 9/2010  | Garmany et al. ......... 375/286 |
| 7,809,020 | B2 | * | 10/2010 | Douglas et al. .......... 370/474 |
| 7,876,869 | B1 | * | 1/2011  | Gupta ...................... 375/350 |
| 8,064,913 | B2 | * | 11/2011 | Gummadi et al. ........ 455/441 |
| 8,160,528 | B2 |   | 4/2012  | Thampi et al. |
| 2010/0309317 | A1 |   | 12/2010 | Wu et al. |
| 2011/0286555 | A1 |   | 11/2011 | Cho et al. |

FOREIGN PATENT DOCUMENTS

| WO | 9734398 A1 | 9/1997 |
| WO | 2011047206 A3 | 4/2011 |

OTHER PUBLICATIONS

Colonnese, S., et al.; Transient Signal Detection Using Higher Order Moments (6 pgs.); IEEE Transactions on Signal Processing, vol. 47, No. 2; dated Feb. 1999.
Derakhtian, M., et al.; Detection of a Bandlimited Signal with Unknown Parameters (4 pgs.); IEEE/SP 15th Workshop on Statusitical Signal Processing, 978-1-4244-2710; dated Sep. 2009.
Dicke, R., et al.; Atmospheric Absorption Measurements with a Microwave Radiometer (9 pgs.); Physical Review, vol. 70, Nos. 5, 6; dated Sep. 1946.

(Continued)

*Primary Examiner* — Nhan Le
(74) *Attorney, Agent, or Firm* — Manita Rawat; Duane Morris LLP

(57) ABSTRACT

A detection system includes a receiver configured to generate a receiver signal representative of detected electromagnetic energy, and an analog-to-digital converter (ADC) configured to generate a plurality of signal samples based on the receiver signal. The detection system also includes a detection module configured to identify a plurality of sample offsets for the signal samples, and execute a plurality of autocorrelation functions on the signal samples to provide an output of each of the autocorrelation functions, wherein each autocorrelation function is executed on at least a portion of the signal samples identified by a sample offset of the plurality of sample offsets. The detection module is also configured to compute a sum of the autocorrelation function outputs, normalize the sum of the autocorrelation function outputs, and determine whether a signal of interest is present within the electromagnetic energy based on the normalized sum.

20 Claims, 4 Drawing Sheets

(56) References Cited

OTHER PUBLICATIONS

Hock, K.; Narrowband Weak Signal Detection by Higher Order Spectrum (6 pgs.); IEEE Transactions on Signal Processing, vol. 44, No. 4; dated Apr. 1996.

Kokkinen, K., et al.; On the Implementation of Autocorrelation-based Feature Detector (4 pgs.); Proceedings of the 4th International Symposium on Communications, Control and Signal Processing, ISCCSP 2010, Limassol, Cyprus, dated Mar. 3-5, 2010.

Misra, S., et al.; Microwave Radiometer Radio-Frequency Interference Detection Algorithms: A Comparative Study (13 pgs.); IEEE Transactions on Geoscience and Remote Sensing, vol. 47, No. 11; dated Nov. 2009.

Piepmeier, J., et al.; A Double Detector for RFI Mitigation in Microwave Radiometers (8 pgs.); IEEE Transactions on Geoscience and Remote Sensing, vol. 46, No. 2; dated Feb. 2008.

Deroo, R., et al.; Sensitivity of the Kurtosis Statistic as a Detector of Pulsed Sinusoidal Radio Frequency Interference in a Microwave Radiometer Receiver (4 pgs.); IEEE Transactions in Geoscience and Remote Sensing, vol. 45, No. 7; dated Jul. 2007.

Sattar, F., et al.; On Detection Using Filter Banks and Higher Order Statistics (11 pgs.); IEEE Transactions on Aerospace and Electronic Systems, vol. 36, No. 4; dated Oct. 2000.

Tugnait, J.; Detection of Non-Gaussian Signals Using Integrated Polyspectrum (13 pgs.); IEEE Transactions on Signal Processing, vol. 42, No. 11; dated Nov. 1994.

Urkowitz, H.; Energy Detection of Unknown Deterministic Signals (9 pgs.); Proceedings of the IEEE, vol. 55, No. 4; dated Apr. 1967.

Schwartz, M., et al.; Signal Processing: Discrete Spectral Analysis, Detection, and Estimation (3 pgs.); McGraw-Hill, 1975.

Torrieri, D.; Principles of Secure Communication Systems, 2nd Ed. Artech House 1992, pp. 291-312.

Nicholson, D. L.; Physad Spectrum Signal Design. Computer Science Press 1988, pp. 158-165.

* cited by examiner

DETECTION SYSTEM, CONTROLLER, AND METHOD OF DETECTING A SIGNAL OF INTEREST

BACKGROUND OF THE INVENTION

The field of the invention relates generally to communication systems and, more particularly, to detection systems that may be used with such systems.

At least some known communication systems, such as, for example, radio broadcasting systems, use antennas to transmit and/or receive signals. However, such signals may be masked by noise and/or may be attenuated due to a transmission medium and/or a distance the signals travel before reaching the antenna, for example. Accordingly, signals may be difficult to detect rapidly.

At least some communication systems use signal processing algorithms or other detection algorithms to detect signals of interest. Such detection algorithms often rely on filters to filter out noise and/or to isolate frequencies of interest, or rely on detecting energy that exceeds the energy of background noise. In addition, at least some known detection algorithms require prior knowledge or selection of a detection threshold, a bandwidth, and a center frequency of the signal of interest to enable the detection algorithms to detect the signal of interest. Accordingly, in such detection algorithms, characteristics of the signal of interest are required to be known before the signal of interest may be detected or identified.

BRIEF DESCRIPTION OF THE INVENTION

In one embodiment, a detection system is provided that includes a receiver configured to detect electromagnetic energy and to generate a receiver signal representative of the detected electromagnetic energy, and an analog-to-digital converter (ADC) coupled to the receiver. The ADC is configured to receive the receiver signal and to generate a plurality of digital signal samples based on the receiver signal. The detection system also includes a detection module coupled to the ADC. The detection module is configured to identify a plurality of sample time offsets for the plurality of signal samples, and execute a plurality of autocorrelation functions on the plurality of signal samples to provide an output of each of the autocorrelation functions, wherein each autocorrelation function of the plurality of autocorrelation functions is executed on at least a portion of the plurality of signal samples identified by a sample offset of the plurality of sample offsets. The detection module is also configured to compute a sum of the autocorrelation function outputs, normalize the sum of the autocorrelation function outputs, and determine whether a signal of interest is present within the electromagnetic energy based on the normalized sum.

In another embodiment, a controller is provided for use with a detection system including a receiver and an analog-to-digital converter (ADC). The controller includes a memory configured to store a plurality of computer-executable instructions, and a processor coupled to the memory for executing the plurality of computer-executable instructions, wherein, when executed by the processor, the plurality of computer-executable instructions configure the processor to receive a plurality of signal samples from the ADC, the plurality of signal samples representative of electromagnetic energy detected by the receiver. The processor is also configured to identify a plurality of sample offsets for the plurality of signal samples, and to execute a plurality of autocorrelation functions on the plurality of signal samples to provide an output of each of the autocorrelation functions, wherein each autocorrelation function of the plurality of autocorrelation functions is executed on at least a portion of the plurality of signal samples identified by a sample offset of the plurality of sample offsets. The processor is further configured to compute a sum of the autocorrelation function outputs, normalize the sum of the autocorrelation function outputs, and determine whether a signal of interest is present within the electromagnetic energy based on the normalized sum.

In yet another embodiment, a method of detecting a signal of interest is provided that includes receiving a plurality of signal samples from an analog-to-digital converter (ADC), the plurality of signal samples representative of electromagnetic energy detected by a receiver. The method also includes identifying a plurality of sample offsets for the plurality of signal samples, and executing, by a processor, a plurality of autocorrelation functions on the plurality of signal samples to provide an output of each of the autocorrelation functions, wherein each autocorrelation function of the plurality of autocorrelation functions is executed on at least a portion of the plurality of signal samples identified by a sample offset of the plurality of sample offsets. The method further includes computing, by the processor, a sum of the autocorrelation function outputs, normalizing the sum of the autocorrelation function outputs, and determining whether a signal of interest is present within the electromagnetic energy based on the normalized sum.

DETAILED DESCRIPTION OF THE INVENTION

The exemplary systems and methods described herein overcome at least some known disadvantages associated with at least some known detection systems or algorithms. The embodiments described herein provide a detection module that executes a plurality of autocorrelation functions on a plurality of digital signal samples at each of a plurality of frequencies. Each autocorrelation function is executed on the signal samples at a plurality of sample offsets within a predetermined range of sample offsets. An output of each of the autocorrelation functions for a selected frequency is summed, and the sum is normalized based on an output of the autocorrelation function executed at a sample offset of 0. The normalized output is compared to a detection threshold to determine if a signal of interest is present. Because of the normalization step in the signal processing procedure the value of the threshold is largely independent of the actual signal amplitude. In addition, a center frequency of the signal of interest is identified. Accordingly, the exemplary detection module provides a cost effective and convenient solution to detect a signal of interest without knowing the amplitude of the signal or the center frequency of the signal. Moreover, the detection module facilitates detecting a signal of interest without being susceptible to a varying level of noise that may otherwise obscure the signal of interest.

Figure 1:
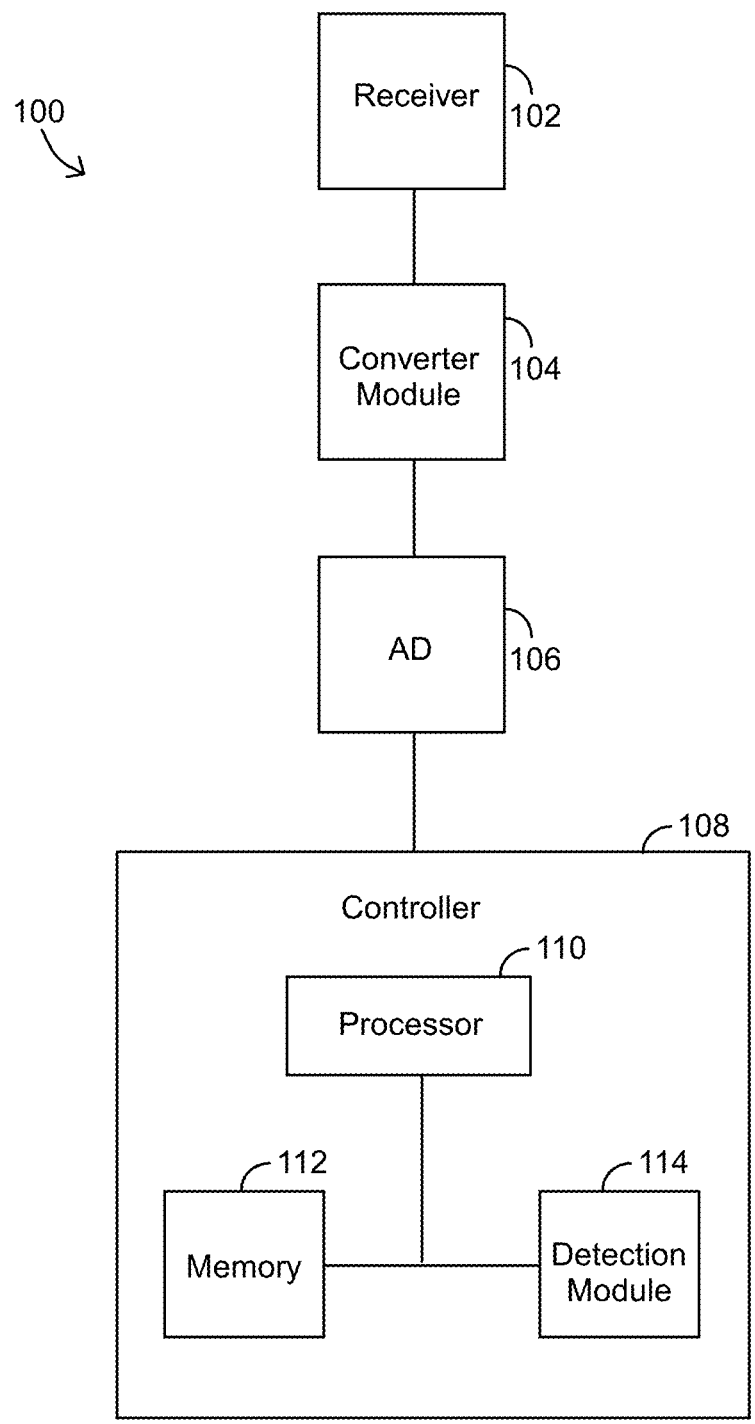
FIG. 1 is a block diagram of an exemplary detection system.

FIG. 1 illustrates an exemplary detection system 100 that may be used to detect a signal of interest. In the exemplary embodiment, detection system 100 includes a receiver 102, a converter module 104 coupled to receiver 102, an analog-to-digital converter (ADC) 106 coupled to receiver 102 through converter module 104, and a controller 108 coupled to ADC 106.

Receiver 102 detects and/or measures ambient electromagnetic energy and generates a signal representative of the electromagnetic energy (hereinafter referred to as a "receiver signal"). In the exemplary embodiment, receiver 102 is an antenna or another suitable device that detects and/or measures electromagnetic energy.

The receiver signal is transmitted to converter module 104 to perform an initial down-conversion of the signal to a predetermined frequency. In the exemplary embodiment, the receiver signal is down-converted from a first, or high, frequency to a second, or intermediate, frequency. The intermediate frequency may be selected to be a commonly used standard, such as 70 MHz, or may be selected based on whether baseband or bandpass sampling with the ADC is chosen. The receiver signal may be down-converted to any suitable frequency that enables detection system 100 to function as described herein.

ADC 106 receives the receiver signal from receiver 102 (as initially down-converted from converter module 108), and converts the receiver signal to a plurality of digital values (referred to herein as "signal samples" or "samples") representative of the receiver signal. ADC 106 transmits one or more digital signals (hereinafter referred to as a "sampled signal") including the signal samples to controller 108 for processing.

Controller 108 includes at least one processor 110, at least one memory 112, and a detection module 114. Processor 110 includes any suitable programmable system including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Processor 110 receives the sampled signal and, in one embodiment, stores the signal samples in memory 112.

Memory 112 includes a computer-readable medium, such as, without limitation, a hard disk drive, a solid state drive, a diskette, a flash drive, a compact disc, a digital video disc, random access memory (RAM), and/or any suitable storage device that enables processor 110 to store, retrieve, and/or execute instructions and/or data. Memory 112 may include one or more local and/or remote storage devices.

While detection module 114 is illustrated as being separate from processor 110 and memory 112, this is for convenience only. It should be recognized that detection module 114 may be incorporated and/or implemented within processor 110 or memory 112. For example, detection module 114 may be implemented as a plurality of computer-executable instructions or program modules that are stored within memory 112 and that are executed by processor 110. Alternatively, detection module 114 may be implemented as a plurality of circuit elements within controller 108 or coupled to controller 108. Detection module 114 receives the signal samples and determines whether a signal of interest is included within the receiver signal. If a signal of interest is detected by detection module 114, detection module 114 identifies a center frequency of the signal of interest, as described more fully herein.

Figure 2:
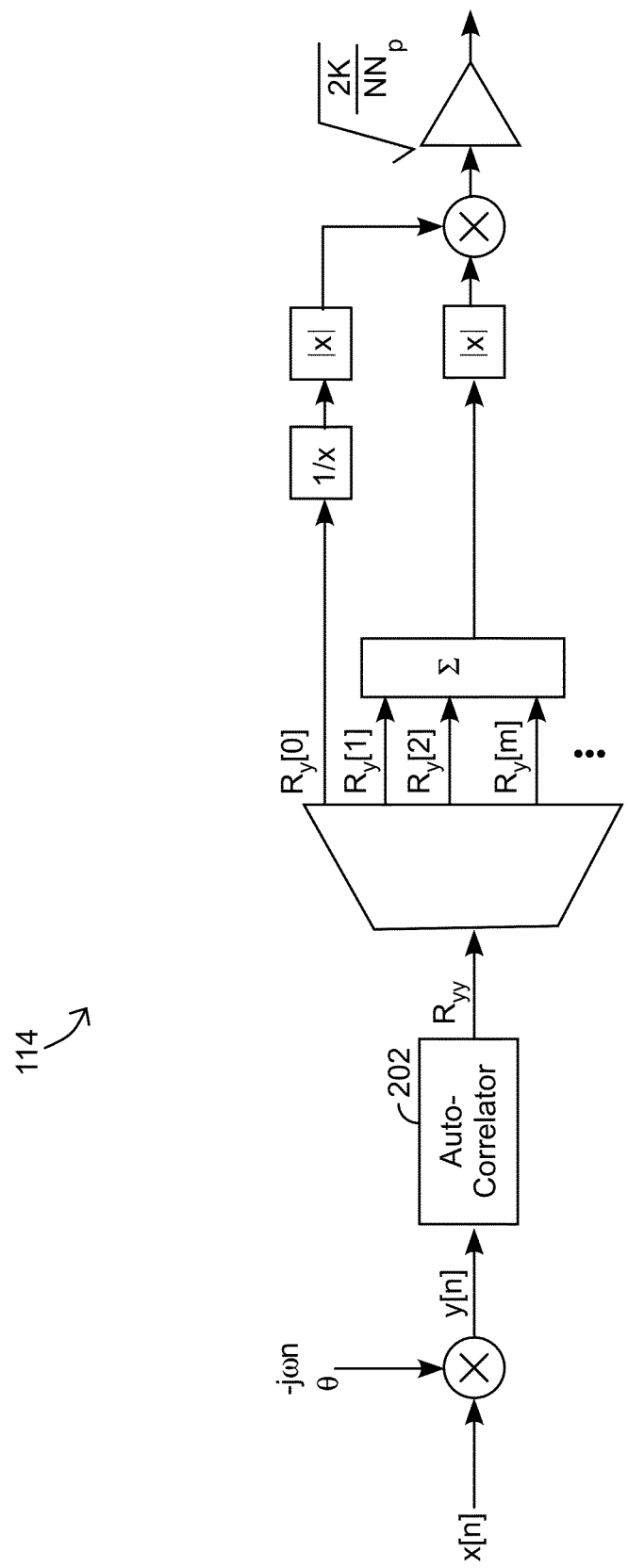
FIG. 2 is a block diagram of an exemplary detection module that may be used with the detection system shown in FIG. 1.

FIG. 2 is a block diagram of an exemplary detection module 114 that may be used with detection system 100 (shown in FIG. 1). In the exemplary embodiment, at each frequency of interest n within a predetermined frequency range, detection module 114 receives a sampled signal x[n] of length N (i.e., having N number of samples) from ADC 106. Detection module 114 down-converts the sampled signal x[n] by multiplying x[n] by the term $e^{-j\omega n}$ to obtain a down-converted signal y[n] at the frequency of interest, wherein $\omega$ is the down-conversion frequency. The sampled signal x[n] is sometimes referred to as a passband signal, and the down-converted signal y[n] is sometimes referred to as a baseband signal.

The down-converted signal y[n] is transmitted to an autocorrelator module 202 that executes one or more autocorrelation functions on the down-converted signal y[n]. The autocorrelation function is:

$$R_y[m] = \begin{cases} \dfrac{1}{N} \sum_{n=0}^{N-m-1} y[n+m] y \cdot [n], & 0 \leq m \leq K \\ R_y[-m], & -K \leq m < 0 \end{cases} \quad \text{Equation 1}$$

wherein $R_y[m]$ is a result of a limited autocorrelation function at time offset m of the down-converted signal y[n], K is a value used to select the maximum time offset of the autocorrelation function, m is an offset of the down-converted signal (i.e., an offset or delay of the signal samples), N is a number of samples included within the sampled signal x[n] (and thereby a number of samples included within the down-converted signal y[n]), and y*[n] is a complex conjugate of the down-converted signal y[n].

Accordingly, at each frequency $\omega$ within a bandwidth of interest, a correlation of a first time series of samples of the down-converted signal y[n] is computed, using Equation 1, with respect to a second time series of samples of the down-converted signal y[n] that is offset, or delayed, by m number of samples with respect to the first time series of samples. The length of the autocorrelation function in Equation 1 is based on K (e.g., 2K+1), which is selected to be greater than 1. In a specific embodiment, K is selected to be about 10. However, any suitable value may be selected for K. In the exemplary embodiment, the autocorrelation function is executed over a plurality of sample offsets m, such as between 1 and about 10 to obtain the value $R_y[m]$ (also known as an autocorrelation coefficient at offset m). In addition, the autocorrelation function is executed for a sample offset of 0 to obtain the value of $R_y[0]$.

A non-zero value of the autocorrelation function for m>0 indicates the presence of a signal in addition to background noise. In addition, a value of the autocorrelation function at sample offset m=0 is proportional to a variance of the received signal, thus providing a measure of signal plus noise floor. An output of detection module 114 is therefore scaled, or normalized, by the value of the autocorrelation function at sample offset 0 to facilitate making the output of detection module 114 substantially independent of an amplitude of the received signal. As such, detection module 114 is less sensitive to an amplitude of the noise floor than at least some known detection systems.

Accordingly, the output of detection module 114 is computed based on a sum of the autocorrelation coefficient $R_y[m]$ at each offset m (with the exception of offset 0 which is used to normalize the output as described herein). More specifically, the output is computed based on Equation 2:

$$\text{Output} = \left| \frac{\left| \sum_{m=1}^{K} R_y[m] \right|}{|R_y[0]| * \sqrt{\frac{2K}{N * N_p}}} \right| \quad \text{Equation 2}$$

wherein $R_y[0]$ is the value of the autocorrelation function at sample offset 0 of y[n], and $N_p$ is a number of samples of y[n] per cycle (i.e., per Hertz). $R_y[0]$ and $$\sqrt{\frac{2K}{N * N_p}}$$

are used as normalization factors to facilitate normalizing, or self-calibrating, the output of detection module 114. In addition, as the term $$\sqrt{\frac{2K}{N * N_p}}$$

includes $N_p$, the output of detection module 114 is scaled by the number of samples per cycle.

The output of Equation 2 (also referred to herein as a "detection metric" or a "normalized sum of autocorrelation function outputs") is used to detect a signal of interest within the sampled signal x[n]. More specifically, the output of Equation 2 may be used to determine whether a non-Gaussian signal has been detected, and to determine the center frequency of the detected signal. For example, if the output of Equation 2 (i.e., the output of detection module 114) is greater than a detection threshold, a non-Gaussian signal is detected with a center frequency at ω, where ω is the down-conversion frequency. In the exemplary embodiment, the detection threshold is a value of about 2. Alternatively, the detection threshold may be selected as any other suitable value that enables detection module 114 to function as described herein. The detection metric, the detected signal of interest, and/or the center frequency of the detected signal of interest may be transmitted to processor 110 and/or to any other device or system for display to a user and/or for analysis. For example, in one embodiment, the detection metric may be analyzed by processor 110 to determine whether the bandwidth of interest includes any non-Gaussian signals for use in determining unused frequency spectrums.

Figure 3:
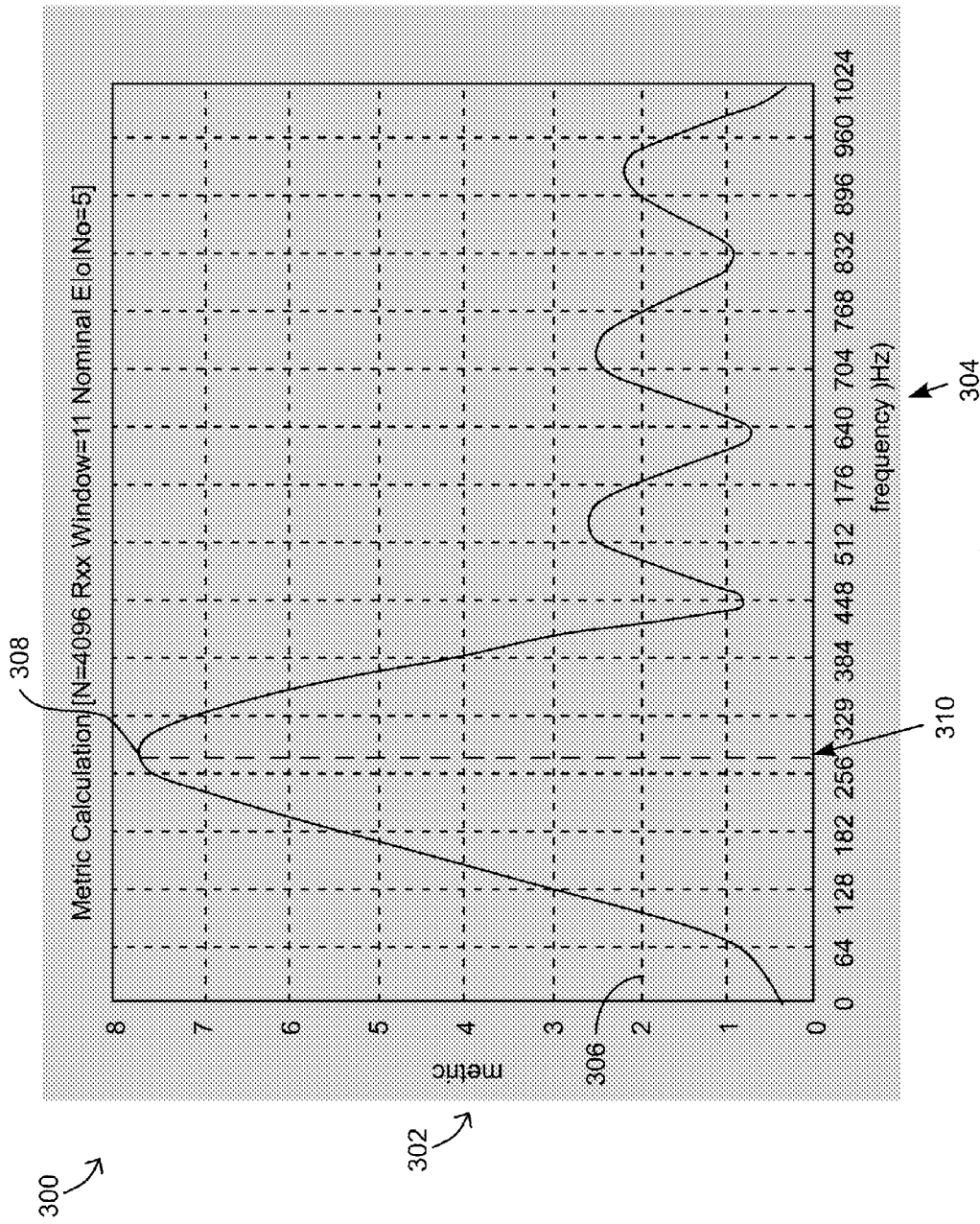
FIG. 3 is a graph of an exemplary output of the detection module shown in FIG. 2.

FIG. 3 is a graph 300 of an exemplary output of detection module 114 (shown in FIG. 1). More specifically, graph 300 illustrates the output of Equation 2, i.e., a detection metric 302 generated by detection module 114 with respect to frequency 304.

In the exemplary embodiment, detection metric 302 identifies a signal of interest if detection metric 302 exceeds a predetermined detection threshold 306. A peak 308 of detection metric 302 identifies a center frequency 310 of the signal of interest. Accordingly, detection metric 302 may be used by detection module 114, by processor 110 (shown in FIG. 1), or by another device to identify a signal of interest and the center frequency of the signal of interest.

Figure 4:
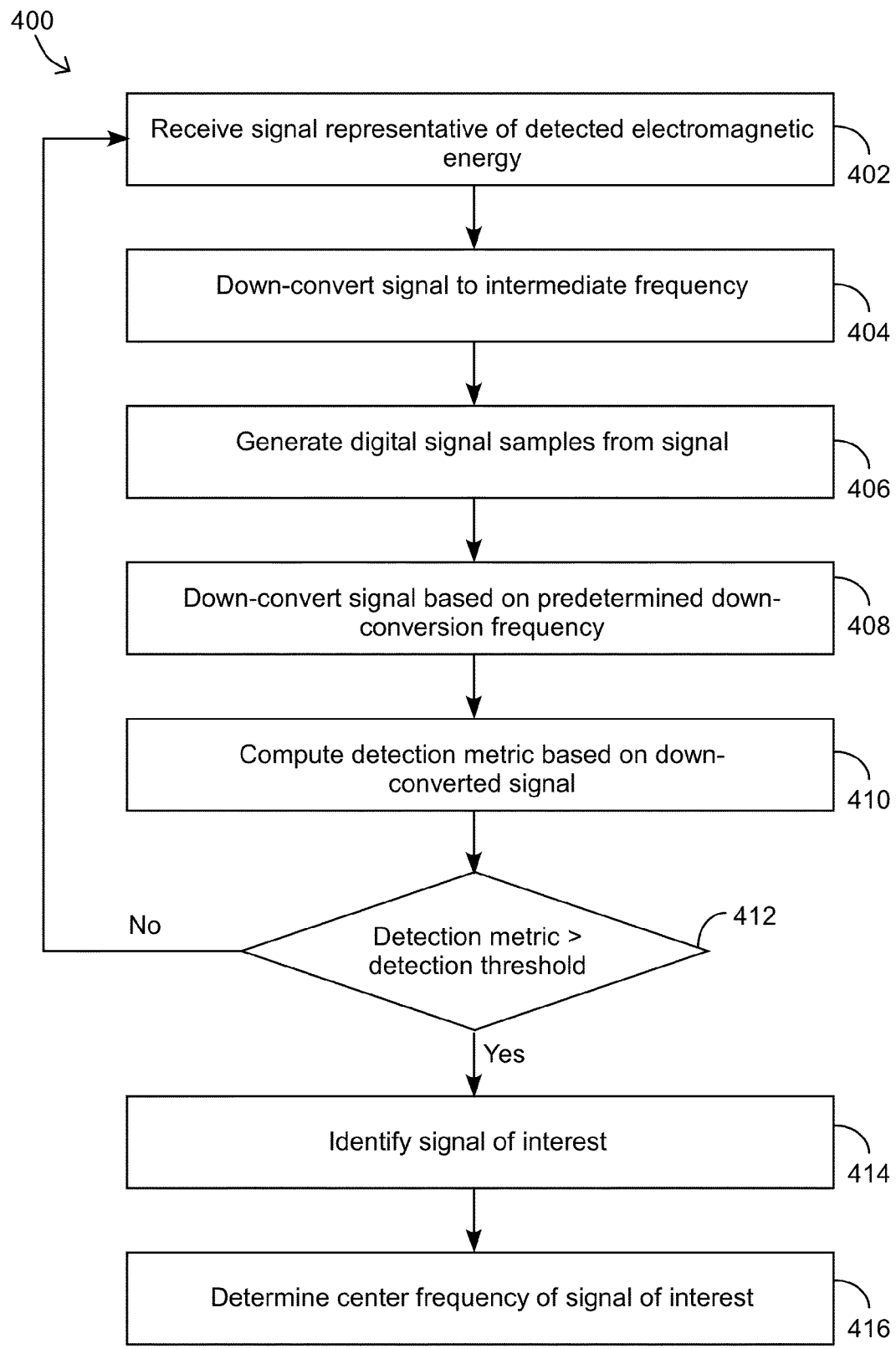
FIG. 4 is a flow diagram of an exemplary method of detecting a signal of interest that may be used with the detection module shown in FIG. 2.

FIG. 4 is a flow diagram of an exemplary method 400 of detecting a signal of interest. In the exemplary embodiment, at least a portion of method 400 is implemented by instructions stored in a computer-readable medium, such as memory 112, and the instructions are executed by detection module 114 (i.e., by processor 110) (shown in FIG. 1) to perform the steps of method 400.

In the exemplary embodiment, a signal representative of detected electromagnetic energy is received 402 from receiver 102. The signal is down-converted 404 to an intermediate frequency and is transmitted to ADC 106 (shown in FIG. 2). ADC 106 generates 406 a plurality of digital signal samples from the intermediate frequency signal and transmits the signal samples to detection module 114.

Detection module 114 down-converts 408 the intermediate frequency signal, for example, based on a predetermined down-conversion frequency as described above with reference to FIG. 2. Detection module 114 computes 410 or calculates a detection metric based on the down-converted signal using Equations 1 and 2 (described above with reference to FIG. 2). Detection module 114 compares the detection metric to a predetermined detection threshold and determines 412 whether the detection metric exceeds the detection threshold.

If the detection metric does not exceed the detection threshold, no signal of interest is detected and method 400 returns to receiving 402 a signal representative of the detected electromagnetic energy. However, if the detection metric exceeds the detection threshold, a signal of interest is identified 414, for example, by processor 110. The center frequency of the signal of interest is determined 416, for example, to be a frequency at which the detection metric peaks, or reaches a highest value.

A technical effect of the detection system, the controller, and the method described herein includes one or more of: (a) receiving a plurality of signal samples from an analog-to-digital converter (ADC), the plurality of signal samples representative of electromagnetic energy detected by a receiver; (b) identifying a plurality of sample offsets for a plurality of signal samples; (c) executing, by a processor, a plurality of autocorrelation functions on a plurality of signal samples to provide an output of each of the autocorrelation functions, wherein each autocorrelation function of the plurality of autocorrelation functions is executed on at least a portion of the plurality of signal samples identified by a sample offset of the plurality of sample offsets; (d) computing, by a processor, a sum of a plurality of autocorrelation function outputs; (e) normalizing a sum of autocorrelation function outputs; and (f) determining whether a signal of interest is present within electromagnetic energy based on a normalized sum of autocorrelation function outputs.

Exemplary embodiments of a detection system, a controller, and a method of detecting a signal of interest are described above in detail. The detection system, the controller, and the method are not limited to the specific embodiments described herein, but rather, components of the system and/or controller and/or steps of the method may be utilized independently and separately from other components and/or steps described herein. For example, the detection module may also be used in combination with other systems and methods, and is not limited to practice with only the detection system as described herein. Rather, the exemplary embodiment can be implemented and utilized in connection with many other systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A detection system comprising:
   a receiver configured to detect electromagnetic energy and to generate a receiver signal representative of the detected electromagnetic energy;
   an analog-to-digital converter (ADC) coupled to said receiver, said ADC configured to receive the receiver signal and to generate a plurality of signal samples based on the receiver signal; and
   a detection module coupled to said ADC, said detection module configured to:
   identify a plurality of sample offsets for the plurality of signal samples;
   execute a plurality of autocorrelation functions on the plurality of signal samples to provide an output of each of the autocorrelation functions, wherein each autocorrelation function of the plurality of autocorrelation functions is executed on at least a portion of the plurality of signal samples identified by a sample offset of the plurality of sample offsets;
   compute a sum of the autocorrelation function outputs;
   normalize the sum of the autocorrelation function outputs; and
   determine whether a signal of interest is present within the electromagnetic energy based on the normalized sum.

2. The detection system in accordance with claim 1, wherein a plurality of frequencies are identified within a bandwidth of interest, said detection module further configured to execute the plurality of autocorrelation functions for each of the plurality of frequencies.

3. The detection system in accordance with claim 1, wherein said detection module is implemented by a processor, said processor is configured to identify a center frequency of the signal of interest upon the determination that the signal of interest is present within the electromagnetic energy.

4. The detection system in accordance with claim 1, further comprising a converter module configured to down-convert the receiver signal from a first frequency to a second frequency before the receiver signal is received by the ADC.

5. The detection system in accordance with claim 1, wherein said detection module is implemented by a processor, said processor is configured to down-convert the plurality of signal samples from a first frequency to a second frequency.

6. The detection system in accordance with claim 1, wherein said detection module is further configured to compare the normalized sum to a detection threshold.

7. The detection system in accordance with claim 6, wherein said detection module is configured to determine that the signal of interest is present upon a determination that the normalized sum exceeds the detection threshold.

8. The detection system in accordance with claim 1, wherein said detection module is configured to execute an autocorrelation function of the plurality of autocorrelation functions at a sample offset of 0, said detection module further configured to normalize the sum of autocorrelation function outputs based on an output of the autocorrelation function executed at the sample offset of 0.

9. A controller for use with a detection system including a receiver and an analog-to-digital converter (ADC), said controller comprising:
   a memory configured to store a plurality of computer-executable instructions; and
   a processor coupled to said memory for executing the plurality of computer-executable instructions, wherein, when executed by said processor, the plurality of computer-executable instructions configure said processor to:
   receive a plurality of signal samples from the ADC, the plurality of signal samples representative of electromagnetic energy detected by the receiver;
   identify a plurality of sample offsets for the plurality of signal samples;
   execute a plurality of autocorrelation functions on the plurality of signal samples to provide an output of each of the autocorrelation functions, wherein each autocorrelation function of the plurality of autocorrelation functions is executed on at least a portion of the plurality of signal samples identified by a sample offset of the plurality of sample offsets;
   compute a sum of the autocorrelation function outputs;
   normalize the sum of the autocorrelation function outputs; and
   determine whether a signal of interest is present within the electromagnetic energy based on the normalized sum.

10. The controller in accordance with claim 9, wherein a plurality of frequencies are identified within a bandwidth of interest, said processor further configured to execute the plurality of autocorrelation functions for each of the plurality of frequencies.

11. The controller in accordance with claim 9, wherein said processor is configured to identify a center frequency of the signal of interest upon the determination that the signal of interest is present within the electromagnetic energy.

12. The controller in accordance with claim 9, said processor is configured to down-convert the plurality of signal samples from a first frequency to a second frequency.

13. The controller in accordance with claim 9, wherein said processor is further configured to compare the normalized sum to a detection threshold.

14. The controller in accordance with claim 13, wherein said processor is configured to determine that the signal of interest is present upon a determination that the normalized sum exceeds the detection threshold.

15. The controller in accordance with claim 9, wherein said processor is configured to execute an autocorrelation function of the plurality of autocorrelation functions at a sample offset of 0, said processor further configured to normalize the sum of autocorrelation function outputs based on an output of the autocorrelation function executed at the sample offset of 0.

16. A method of detecting a signal of interest, said method comprising:
   receiving a plurality of signal samples from an analog-to-digital converter (ADC), the plurality of signal samples representative of electromagnetic energy detected by a receiver;
   identifying a plurality of sample offsets for the plurality of signal samples;

executing, by a processor, a plurality of autocorrelation functions on the plurality of signal samples to provide an output of each of the autocorrelation functions, wherein each autocorrelation function of the plurality of autocorrelation functions is executed on at least a portion of the plurality of signal samples identified by a sample offset of the plurality of sample offsets;

computing, by the processor, a sum of the autocorrelation function outputs;

normalizing the sum of the autocorrelation function outputs; and determining whether a signal of interest is present within the electromagnetic energy based on the normalized sum.

17. The method in accordance with claim 16, further comprising:

identifying a plurality of frequencies within a bandwidth of interest; and executing the plurality of autocorrelation functions for each of the plurality of frequencies.

18. The method in accordance with claim 16, further comprising identifying a center frequency of the signal of interest upon the determination that the signal of interest is present within the electromagnetic energy.

19. The method in accordance with claim 16, further comprising:

comparing the normalized sum to a detection threshold; and determining that the signal of interest is present upon a determination that the normalized sum exceeds the detection threshold.

20. The method in accordance with claim 16, further comprising:

executing an autocorrelation function of the plurality of autocorrelation functions at a sample offset of 0; and normalizing the sum of autocorrelation function outputs based on an output of the autocorrelation function executed at the sample offset of 0.

* * * * *